(12) United States Patent
Ishii et al.

(10) Patent No.: US 11,933,431 B2
(45) Date of Patent: Mar. 19, 2024

(54) THREADED CONNECTION FOR PIPES

(71) Applicants: NIPPON STEEL CORPORATION, Tokyo (JP); VALLOUREC OIL AND GAS FRANCE, Aulnoye-Aymeries (FR)

(72) Inventors: Kazuya Ishii, Tokyo (JP); Kunio Goto, Tokyo (JP); Masaaki Sugino, Tokyo (JP); Yousuke Oku, Tokyo (JP)

(73) Assignees: NIPPON STEEL CORPORATION, Tokyo (JP); VALLOUREC OIL AND GAS FRANCE, Aulnoye-Aymeries (FR)

(*) Notice: Subject to any disclaimer, the term of this patent is extended or adjusted under 35 U.S.C. 154(b) by 311 days.

(21) Appl. No.: 17/427,256

(22) PCT Filed: Feb. 7, 2020

(86) PCT No.: PCT/JP2020/004770
§ 371 (c)(1),
(2) Date: Jul. 30, 2021

(87) PCT Pub. No.: WO2020/016650
PCT Pub. Date: Aug. 20, 2020

(65) Prior Publication Data
US 2022/0128178 A1 Apr. 28, 2022

(30) Foreign Application Priority Data

Feb. 12, 2019 (JP) ................................ 2019-022973

(51) Int. Cl.
*F16L 15/04* (2006.01)
*C25D 7/00* (2006.01)

(52) U.S. Cl.
CPC .............. *F16L 15/04* (2013.01); *C25D 7/003* (2013.01)

(58) Field of Classification Search
CPC ......... F16L 15/08; F16L 15/04; F16L 15/001; C25D 7/003; C23C 18/32
See application file for complete search history.

(56) References Cited

U.S. PATENT DOCUMENTS 5,253,902 A * 10/1993 Petelot ................... F16L 15/001
148/284
9,388,648 B2 7/2016 Chin
(Continued)

FOREIGN PATENT DOCUMENTS

AU 7304181 A 1/1982
JP 63130986 A 6/1988
(Continued)

*Primary Examiner* — David Bochna
(74) *Attorney, Agent, or Firm* — Greer Burns & Crain Ltd.

(57) ABSTRACT

A threaded connection for pipes includes a pin, a box, a shoulder part plating layer, and a non-shoulder part plating layer. The shoulder part plating layer has an outermost layer formed of a high friction coefficient plating layer, and is arranged on a pin side shoulder part and/or a box side shoulder part. The non-shoulder part plating layer has an outermost layer formed of a low friction coefficient plating layer having a coefficient of friction lower than a coefficient of friction of the high friction coefficient plating layer, and the non-shoulder part plating layer is arranged on at least one of a pin side thread part, a pin side metal seal part, a box side thread part, and a box side metal seal part.

14 Claims, 8 Drawing Sheets

(56) References Cited

U.S. PATENT DOCUMENTS

| | | | |
|---|---|---|---|
| 9,752,710 B2* | 9/2017 | Goto | F16L 15/08 |
| 2008/0217916 A1 | 9/2008 | Nagasaku et al. | |
| 2009/0033087 A1* | 2/2009 | Carcagno | F16L 15/004 |
| | | | 285/55 |
| 2011/0084483 A1* | 4/2011 | Nunez | F16L 15/001 |
| | | | 427/258 |
| 2014/0284919 A1 | 9/2014 | Goto et al. | |
| 2015/0368986 A1 | 12/2015 | Narikawa et al. | |
| 2019/0010767 A1 | 1/2019 | Goto | |
| 2019/0331262 A1 | 10/2019 | Goto | |
| 2020/0166163 A1 | 5/2020 | Goto | |
| 2021/0364119 A1 | 11/2021 | Goto | |
| 2022/0064561 A1* | 3/2022 | Goto | F16L 15/08 |
| 2022/0128178 A1* | 4/2022 | Ishii | F16L 15/08 |

FOREIGN PATENT DOCUMENTS

| | | |
|---|---|---|
| JP | 07260053 A | 10/1995 |
| JP | 2007071231 A | 3/2007 |
| JP | 2013108556 A | 6/2013 |
| WO | 2016170031 A1 | 10/2016 |
| WO | 2017110686 A1 | 6/2017 |
| WO | 2018003455 A1 | 1/2018 |
| WO | 2018216416 A1 | 11/2018 |
| WO | 2018216497 A1 | 11/2018 |

\* cited by examiner

THREADED CONNECTION FOR PIPES

This is a National Phase Application filed under 35 U.S.C. § 371, of International Application No. PCT/JP2020/004770, filed Feb. 7, 2020, the contents of which are incorporated by reference.

TECHNICAL FIELD

The present disclosure relates to a threaded connection for pipes.

BACKGROUND ART

Oil country tubular goods are used for excavation of oil fields or natural gas fields. The oil country tubular goods are formed by connecting a plurality of steel pipes corresponding to the depth of a well. The steel pipes are connected by fastening threaded connections for pipes formed at the end portions of the steel pipes. The oil country tubular goods are pulled up and loosened for an inspection or the like. After the oil country tubular goods are inspected, the oil country tubular goods are fastened again, and used again.

The threaded connection for pipes includes a pin and a box. The pin includes an external thread part and a non-threaded metal contact part formed on the outer peripheral surface of the end portion of the steel pipe. The box includes an internal thread part and a non-threaded metal contact part formed on the inner peripheral surface of the end portion of the steel pipe. Each non-threaded metal contact part includes a metal seal part and a shoulder part. When the steel pipes are fastened with each other, the external thread part and the internal thread part come into contact with each other, the metal seal parts come into contact with each other, and the shoulder parts come into contact with each other.

The thread part and the non-threaded metal contact part of the pin and the box repeatedly receive high friction at the time of fastening and loosening the steel pipes. If these parts do not have sufficient durability against friction, repetition of fastening and loosening causes galling (unrepairable galling). For this reason, the threaded connection for pipes is required to have sufficient durability against friction, that is, to have excellent galling resistance.

Conventionally, compound grease containing heavy metal has been used to enhance galling resistance. Applying compound grease on the surface of the threaded connection for pipes can improve galling resistance of the threaded connection for pipes. However, heavy metal, such as Pb, contained in the compound grease may adversely affect an environment. Accordingly, there has been a demand for a development of a threaded connection for pipes which does not use compound grease.

International Application Publication No. WO2016/170031 (Patent Literature 1) proposes a technique to increase galling resistance of a threaded connection for pipes by plating instead of using compound grease.

A threaded connection for pipes disclosed in Patent Literature 1 include a threaded portion extending over an outer peripheral surface or inner peripheral surface, a first sealing surface on the peripheral surface, and a second sealing surface is capable of producing metal-metal interference with the first sealing surface. The threaded portion and the first sealing surface of the aforementioned threaded connection for pipes are coated with a metallic anti-corrosion and anti-galling layer wherein zinc is the major element by weight.

In addition to the above, Japanese Patent Application Publication No. 63-130986 (Patent Literature 2) proposes a technique to increase gastightness of a threaded connection for pipes by forming plating on the surface of the threaded connection for pipes.

A threaded connection for pipes disclosed in Patent Literature 2 is a tapered thread and includes an external thread and an internal thread. The external thread and the internal thread of the threaded connection for pipes is performed partial surface treatment, such as metal plating, spraying, or forming a phosphate film, with a thickness of 30 to 200 μm for holding gastightness the surface of threads of 1.0 to 2.0 pitch portion.

CITATION LIST

Patent Literature

Patent Literature 1: International Application Publication No. WO2016/170031
Patent Literature 2: Japanese Patent Application Publication No. 63-130986

SUMMARY OF INVENTION

Technical Problem

A torque of the threaded connection for pipes at which fastening is completed (hereinafter referred to as "fastening torque") is determined in advance. The threaded connections for pipes are fastened such that a predetermined fastening torque can be obtained when the fastening is completed. In recent years, due to the increasing depth of oil wells, fastening may in some cases require a fastening torque higher than that of the conventional threaded connection.

A fastening operation of threaded connections for pipes is performed on a marine plant or an oil rig. On the actual site where the threaded connections for pipes are fastened, it is preferable that the fastening operation be efficient. If a fastening torque significantly fluctuates for each threaded connection for pipes, it is necessary to slightly adjust a torque of fastening equipment every time, thus reducing operation efficiency. Accordingly, there has been a demand for a threaded connection for pipes which is threadable at a fastening torque similar to that of a conventional threaded connection, and which is also threadable at a fastening torque higher than that of the conventional threaded connection.

Meanwhile, it is preferable that a fastening torque of the threaded connection for pipes can be easily adjusted. Specifically, when the threaded connections for pipes, each having a shoulder part, are fastened, the shoulder part of the pin and the shoulder part of the box come into contact with each other. A torque which is generated at this point of operation is referred to as a shouldering torque. In fastening the threaded connections for pipes, after a torque reaches the shouldering torque, the threaded connections for pipes are further fastened until the fastening is completed. With such operations, gastightness of the threaded connection for pipes is increased. When fastening is excessive, metal of at least one of the pin and the box starts to be plastically deformed. A torque at this point of operation is referred to as a yield torque.

When a value of a delta torque which is defined by a difference between a yield torque and a shouldering torque is large, a fastening torque can be easily adjusted. Accordingly, it is preferable that the threaded connection for pipes has a large delta torque.

With the use of the technique disclosed in Patent Literature 1 or Patent Literature 2, galling resistance and gastightness of the threaded connection for pipes can be increased. However, in these documents, there is no disclosure to increase a delta torque, or to achieve a fastening torque higher than that of the conventional threaded connection for pipes in fastening.

An objective of the present disclosure is to provide a threaded connection for pipes having a large delta torque and being threadable at both a fastening torque equivalent to that of a conventional threaded connection and a fastening torque higher than that of the conventional threaded connection.

Solution to Problem

A threaded connection for pipes of the present disclosure includes a pin and a box. The pin includes a pin side thread part, a pin side metal seal part, and a pin side shoulder part. The box includes a box side thread part, a box side metal seal part, and a box side shoulder part. The threaded connection for pipes further includes a shoulder part plating layer and a non-shoulder part plating layer. The shoulder part plating layer is arranged on the pin side shoulder part and/or the box side shoulder part. The shoulder part plating layer includes one or more layers. The shoulder part plating layer has an outermost layer formed of a high friction coefficient plating layer. The non-shoulder part plating layer is arranged on at least one of the pin side thread part, the pin side metal seal part, the box side thread part, and the box side metal seal part. The non-shoulder part plating layer includes one or more layers. The non-shoulder part plating layer has an outermost layer formed of a low friction coefficient plating layer having a coefficient of friction lower than a coefficient of friction of the high friction coefficient plating layer.

Advantageous Effects of Invention

The threaded connection for pipes according to the present disclosure has a large delta torque, and is threadable at both a fastening torque equivalent to that of a conventional threaded connection and a fastening torque higher than that of the conventional threaded connection.

DESCRIPTION OF EMBODIMENT

Figure 1:
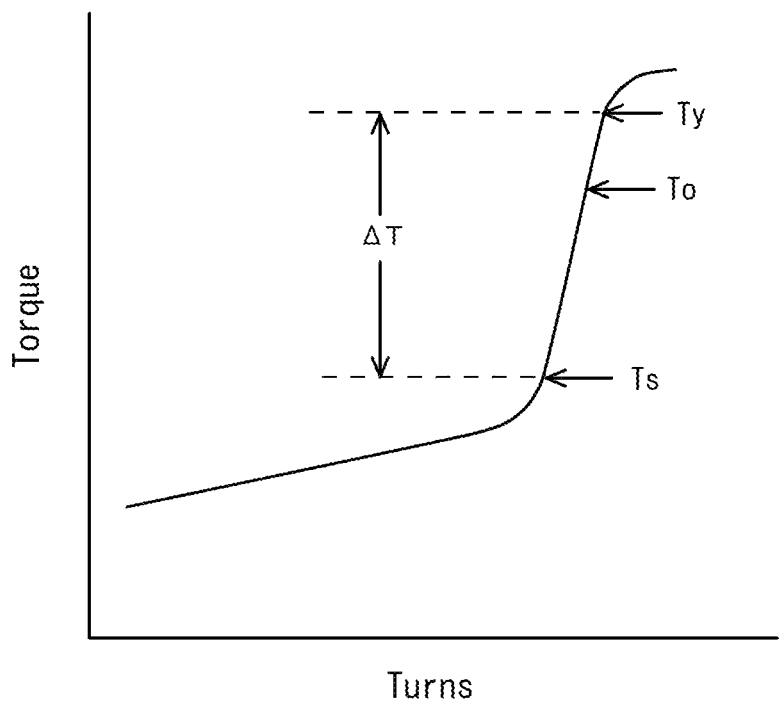
FIG. 1 is a graph illustrating a relation between turns of a steel pipe and torque in fastening a threaded connection for pipes having a shoulder part (torque chart).

Hereinafter, the present embodiment will be described in detail with reference to drawings. In the drawings, identical or corresponding parts are given the same reference characters, and the description of such parts is not repeated.

The present inventors have made various studies with respect to the relation between a plating layer on the surface of the threaded connection for pipes and a fastening torque and a delta torque. As a result of such various studies, the present inventors have obtained the following findings.

In fastening steel pipes, an optimum torque at which fastening is finished (referred to as a fastening torque) is determined in advance. FIG. 1 is a graph illustrating a relation between turns of a steel pipe and torque in fastening a threaded connection for pipes having a shoulder part (torque chart). A graph illustrating the relation between turns of a steel pipe and a torque is referred to as a torque chart hereinafter. Referring to FIG. 1, when the threaded connections for pipes are fastened, a torque increases in proportion to turns at an initial stage. The torque increase rate at this stage of operation is low. When the threaded connections for pipes are further fastened, shoulder parts come into contact with each other. A torque at this point of operation is referred to as a shouldering torque Ts. When the threaded connections for pipes are further fastened after the torque reaches the shouldering torque Ts, the torque increases again in proportion to turns. A torque increase rate at this stage of operation is high. Fastening is completed at a point of time when the torque reaches a predetermined numerical value (fastening torque To).

When a torque at the time of fastening reaches the fastening torque To, metal seal parts interfere with each other at an appropriate interfacial pressure. In this case, gastightness of the threaded connections for pipes increases. Further, a high compression stress and a high bending stress are applied to the threaded connections in an oil well. To prevent loosening of the fastening of the threaded connections for pipes even under such stresses, the threaded connections for pipes are required to be fastened at a sufficiently high torque (appropriate fastening torque To).

If the threaded connections for pipes are further fastened after the torque reaches the fastening torque To, the torque becomes excessively high. When the torque becomes excessively high, a pin and a box are partially plastically deformed. The torque at this point of operation is referred to as a yield torque Ty. When a delta torque ΔT which is defined by the difference between the shouldering torque Ts and the yield torque Ty is large, the fastening torque To can be easily adjusted. Accordingly, a larger delta torque ΔT is preferable.

To increase the delta torque ΔT, it is effective to decrease the shouldering torque Ts or to increase the yield torque Ty. The present inventors considered that the shouldering torque Ts and the yield torque Ty can be adjusted by varying coefficients of friction of the surfaces of the pin and the box. However, even if the surfaces of the pin and the box are simply changed to increase or decrease the coefficients of friction, the shouldering torque Ts and the yield torque Ty generally behave in a similar manner.

Figure 2:
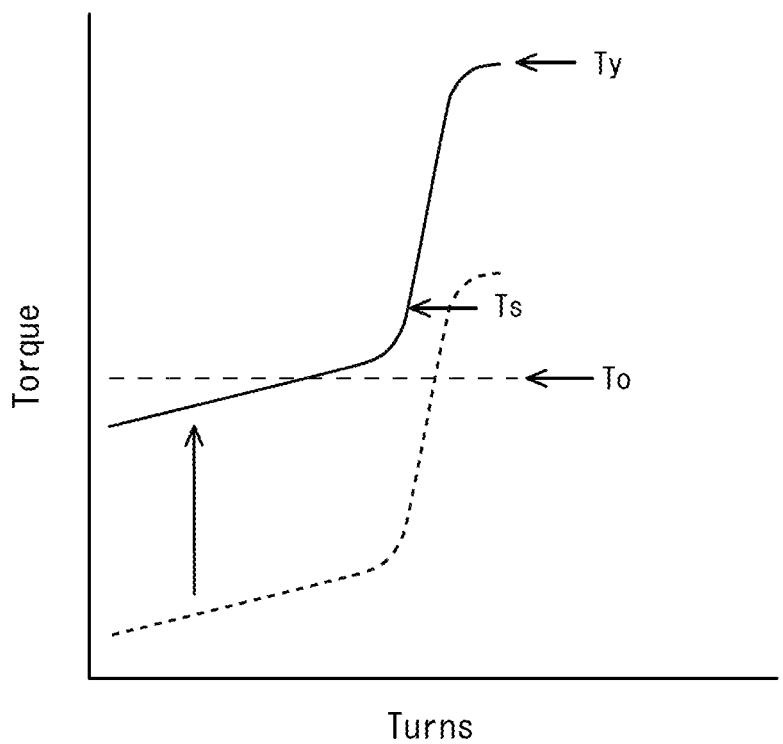
FIG. 2 is a torque chart in a case where shouldering torque and yield torque are both high.

FIG. 2 is a torque chart in a case where the shouldering torque Ts and the yield torque Ty are both high. In FIG. 2, a torque chart of a conventional threaded connection is indicated by a broken line. Referring to FIG. 2, when the coefficients of friction of the pin and the box are increased, although the yield torque Ty is increased, the shouldering torque Ts is also increased (referred to as high shouldering). As a result, even if a torque reaches a fastening torque To of the conventional threaded connection, there may be a case where the shoulder parts do not come into contact with each other so that fastening is not completed (referred to as no shouldering).

Figure 3:
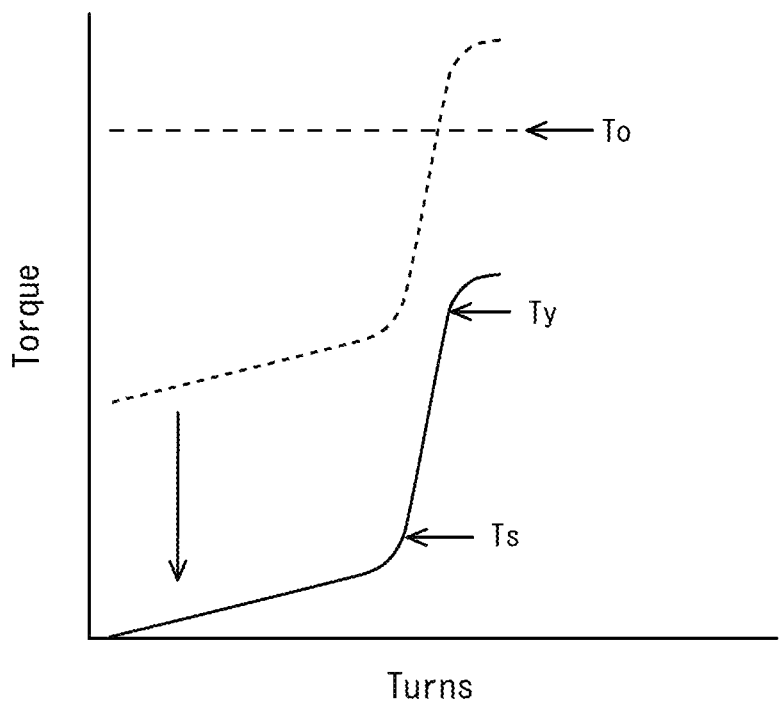
FIG. 3 is a torque chart in a case where shouldering torque and yield torque are both low.

FIG. 3 is a torque chart in a case where the shouldering torque Ts and the yield torque Ty are both low. In FIG. 3, a torque chart of the conventional threaded connection is indicated by a broken line. Referring to FIG. 3, when the coefficients of friction of the pin and the box are reduced, although the shouldering torque Ts is reduced, the yield torque Ty is also reduced. As a result, a torque reaches the yield torque Ty before the torque reaches a predetermined fastening torque To and hence, the shoulder parts or the metal seal parts are yielded. In this case, a sufficient fastening torque To cannot be obtained.

Figure 4:
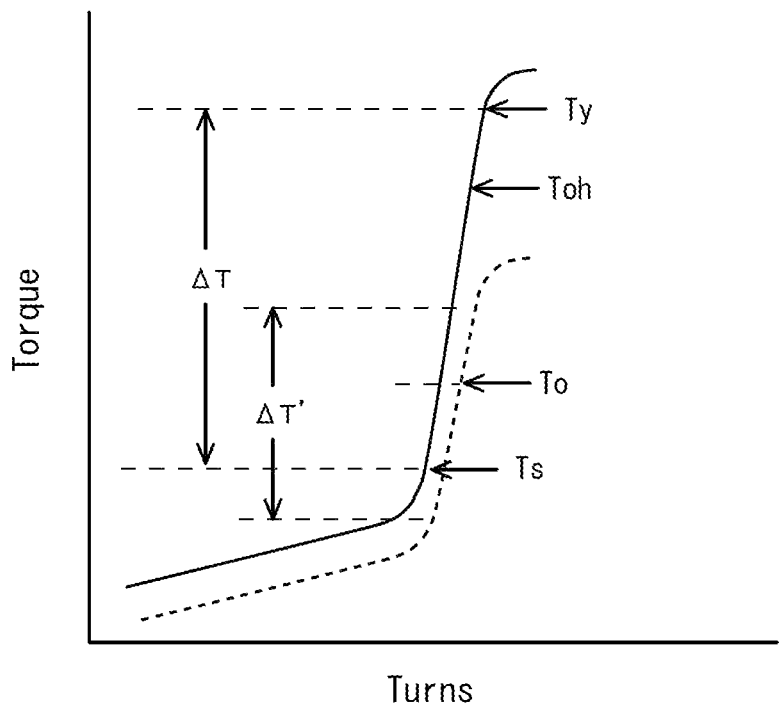
FIG. 4 is a torque chart in a case where shouldering torque is low and yield torque is high.

If the yield torque Ty can be increased while the shouldering torque Ts can be suppressed at a low level, not only that the delta torque ΔT can be increased, but also the threaded connections for pipes can be fastened at a fastening torque To equal to that of conventional threaded connections and, further, can be fastened at a fastening torque Toh higher than that of the conventional threaded connections. FIG. 4 is a torque chart in a case where the shouldering torque Ts is low and the yield torque Ty is high. In FIG. 4, a torque chart of the conventional threaded connection is indicated by a broken line. Referring to FIG. 4, in the torque chart where the shouldering torque Ts is maintained at a low level, and the yield torque Ty is increased, the delta torque ΔT is larger than a delta torque ΔT' of the conventional threaded connection. Further, even if the threaded connections for pipes are fastened at a fastening torque To of the conventional threaded connection, a torque reaches the shouldering torque Ts or more and hence, it is possible to ensure sufficient gastightness. Further, even if the threaded connections for pipes are fastened at the fastening torque Toh higher than the fastening torque To of the conventional threaded connection, the torque is a yield torque Ty or less and hence, the threaded connections for pipes can be fastened without causing yielding.

As a result of extensive studies made by the present inventors, it has been found that, of the surface of a pin and the surface of a box, a part which significantly affects the generation of the shouldering torque Ts differs from a part which significantly affects the generation of the yield torque Ty.

Figure 5:
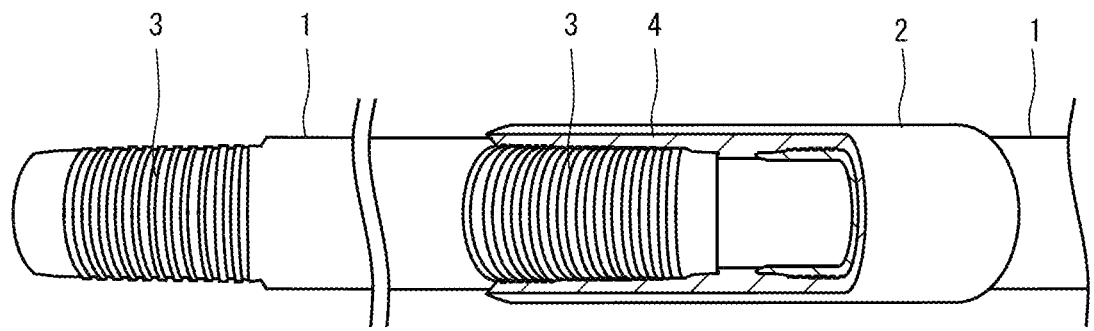
FIG. 5 is a diagram illustrating a configuration of a threaded connection for pipes of a coupling type according to the present embodiment.

FIG. 5 is a diagram illustrating a configuration of the threaded connection for pipes of a coupling type according to the present embodiment. Referring to FIG. 5, the threaded connection for pipes includes a steel pipe 1 and a coupling 2. A pin 3 having an external thread part on the outer surface thereof is formed at both ends of the steel pipe 1. A box 4 having an internal thread part on the inner surface thereof is formed at both ends of the coupling 2. When the pin 3 and the box 4 are fastened to each other, the coupling 2 is mounted on the end of the steel pipe 1.

Figure 6:
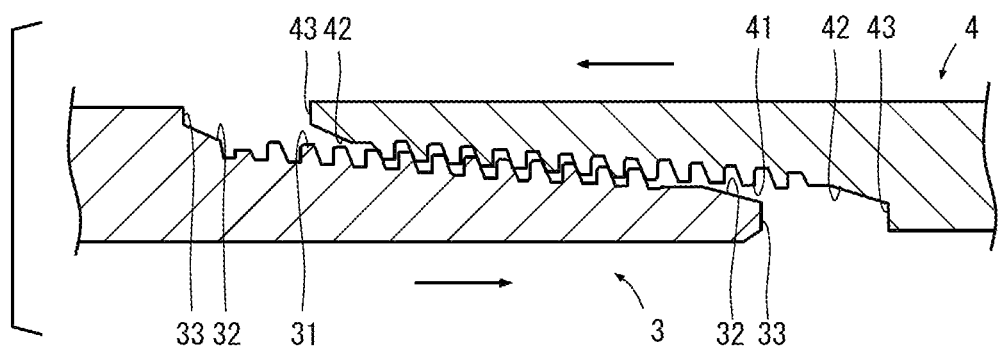
FIG. 6 is a cross-sectional view of the threaded connection for pipes in an initial phase of fastening.

FIG. 6 is a cross-sectional view of the threaded connection for pipes in an initial phase of fastening. Referring to FIG. 6, the pin 3 includes a pin side shoulder part 33, a pin side metal seal part 32, and a pin side thread part 31. The box 4 includes a box side shoulder part 43, a box side metal seal part 42, and a box side thread part 41. In the initial phase of fastening, the pin side thread part 31 and the box side thread part 41 come into contact and slide against each other. As fastening proceeds, next, the pin side metal seal part 32 and the box side metal seal part 42 come into contact and slide against each other. Subsequently, the pin side shoulder part 33 and the box side shoulder part 43 come into contact with each other. A torque at this point of operation is the shouldering torque Ts.

Before the pin side shoulder part 33 and the box side shoulder part 43 come into contact with each other, the pin side thread part 31 and the box side thread part 41 come into contact and slide against each other, and the pin side metal seal part 32 and the box side metal seal part 42 come into contact and slide against each other. That is, it can be considered that parts which significantly affect the shouldering torque Ts are parts other than the pin side shoulder part 33 and the box side shoulder part 43. That is, it can be considered that the parts which significantly affect the shouldering torque Ts are the pin side thread part 31, the box side thread part 41, the pin side metal seal part 32, and the box side metal seal part 42.

Figure 7:
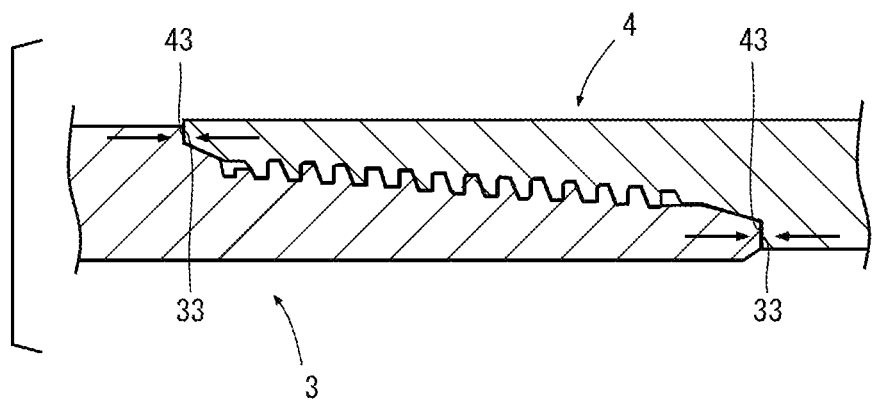
FIG. 7 is a cross-sectional view of the threaded connection for pipes after shouldering.

FIG. 7 is a cross-sectional view of the threaded connection for pipes after shouldering. Referring to FIG. 7, after the pin side shoulder part 33 and the box side shoulder part 43 come into contact with each other, the pin side shoulder part 33 and the box side shoulder part 43 frictionally slide while receiving a strong force in the axial direction of the steel pipe 1. Accordingly, it is expected that a pressure received by the pin side shoulder part 33 and the box side shoulder part 43 is larger than a pressure received by the pin side thread part 31, the box side thread part 41, the pin side metal seal part 32 and the box side metal seal part 42. That is, it can be considered that the parts which significantly affect the yield torque Ty are the pin side shoulder part 33 and the box side shoulder part 43.

From the aforementioned studies, the present inventors have obtained the following findings. A plating layer having a low coefficient of friction is formed on at least one of the pin side thread part 31, the box side thread part 41, the pin side metal seal part 32, and the box side metal seal part 42 which significantly affect the shouldering torque Ts, and a plating layer having a high coefficient of friction is formed on the pin side shoulder part 33 and/or the box side shoulder part 43 which significantly affect the yield torque Ty. With such a configuration, the shouldering torque Ts can be maintained at a low level, and the yield torque Ty can be increased. As a result, it is possible to acquire a threaded connection for pipes having a large delta torque ΔT, and being threadable at both a fastening torque To equivalent to that of a conventional threaded connection and a fastening torque Toh higher than that of the conventional threaded connection.

The threaded connection for pipes of the present embodiment which is completed based on the aforementioned findings includes a pin and a box. The pin includes a pin side thread part, a pin side metal seal part, and a pin side shoulder part. The box includes a box side thread part, a box side metal seal part, and a box side shoulder part. The threaded connection for pipes further includes a shoulder part plating layer and a non-shoulder part plating layer. The shoulder part plating layer is arranged on the pin side shoulder part and/or the box side shoulder part. The shoulder part plating layer includes one or more layers. The shoulder part plating layer has an outermost layer formed of a high friction coefficient plating layer. The non-shoulder part plating layer is arranged on at least one of the pin side thread part, the pin side metal seal part, the box side thread part, and the box side metal seal part. The non-shoulder part plating layer includes one or more layers. The non-shoulder part plating layer has an outermost layer formed of a low friction coefficient plating layer having a coefficient of friction lower than a coefficient of friction of the high friction coefficient plating layer.

The threaded connection for pipes according to the present embodiment has a large delta torque, and is threadable at both a fastening torque equivalent to that of the conventional threaded connection and a fastening torque higher than that of the conventional threaded connection.

The aforementioned shoulder part plating layer may be arranged on the pin side shoulder part, and the aforementioned non-shoulder part plating layer may be arranged on the pin side thread part and the pin side metal seal part.

The aforementioned shoulder part plating layer may be arranged on the box side shoulder part, and the aforementioned non-shoulder part plating layer may be arranged on the box side thread part and the box side metal seal part.

The thickness of the aforementioned shoulder part plating layer may be 1 to 50 μm, and the thickness of the aforementioned non-shoulder part plating layer may be 1 to 50 μm.

When the thickness of each plating layer falls within the aforementioned range, it is possible to more stably obtain an advantageous effect of increasing the yield torque while suppressing the shouldering torque at a low level.

The threaded connection for pipes may further include a lubricant coating. The lubricant coating is arranged on or above at least one of the pin side thread part, the pin side metal seal part, the pin side shoulder part, the box side thread part, the box side metal seal part, and the box side shoulder part as an outermost layer.

In the case where the threaded connection for pipes includes the lubricant coating as the outermost layer, lubricity of the threaded connection for pipes is increased.

The high friction coefficient plating layer may be selected from a group consisting of a Ni—P alloy plating layer, a Zn—Ni alloy plating layer, a Cu plating layer, and a Cr plating layer, and the low friction coefficient plating layer may be selected from a group consisting of a Zn—Ni alloy plating layer, a Cu plating layer, a Cr plating layer, and a Zn plating layer.

In the case where the composition of each plating layer is the aforementioned composition, it is possible to more stably obtain an advantageous effect of increasing the yield torque while suppressing the shouldering torque at a low level.

The high friction coefficient plating layer may be selected from a group consisting of a Ni—P alloy plating layer and a Zn—Ni alloy plating layer, and the low friction coefficient plating layer may be selected from a group consisting of a Cu plating layer, a Cr plating layer, and a Zn plating layer.

In the case where the composition of each plating layer is the aforementioned composition, it is possible to more stably obtain an advantageous effect of increasing the yield torque while suppressing the shouldering torque at a low level.

Hereinafter, the threaded connection for pipes of the present embodiment will be described in detail.

[Threaded Connection for Pipes]

The threaded connection for pipes according to the present embodiment includes the pin and the box. FIG. 5 is a diagram illustrating the configuration of the threaded connection for pipes of a coupling type according to the present embodiment. Referring to FIG. 5, the threaded connection for pipes of a coupling type includes the steel pipe 1 and the coupling 2. The pin 3 having an external thread part on the outer surface thereof is formed on both ends of the steel pipe 1. The box 4 having an internal thread part on the inner surface thereof is formed on both ends of the coupling 2. When the pin 3 and the box 4 are fastened to each other, the coupling 2 is mounted on the end of the steel pipe 1. Although not shown in the drawing, to protect the thread part of the pin 3 and the thread part of the box 4, protectors may be respectively mounted on the pin 3 of the steel pipe 1 and the box 4 of the coupling 2 on which counterpart members are not mounted.

Figure 8:
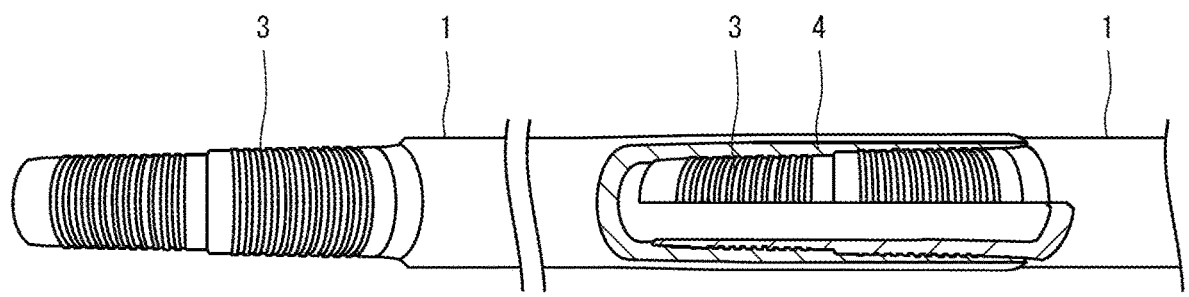
FIG. 8 is a diagram illustrating a configuration of a threaded connection for pipes of an integral type according to the present embodiment.

Meanwhile, a threaded connection for pipes of an integral type may be used where no coupling 2 is used, and the pin 3 is formed on one end of the steel pipe 1, and the box 4 is formed on the other end of the steel pipe 1. FIG. 8 is a diagram illustrating a configuration of a threaded connection for pipes of an integral type according to the present embodiment. Referring to FIG. 8, the threaded connection for pipes of an integral type includes the steel pipe 1. The pin 3 having an external thread part on the outer surface thereof is formed on one end of the steel pipe 1. The box 4 having an internal thread part on the inner surface thereof is formed on the other end of the steel pipe 1. When the pin 3 and the box 4 are fastened to each other, the steel pipes 1 can be connected with each other. The threaded connection for pipes of the present embodiment can be used for both a threaded connection for pipes of a coupling type and a threaded connection for pipes of an integral type.

Figure 9:
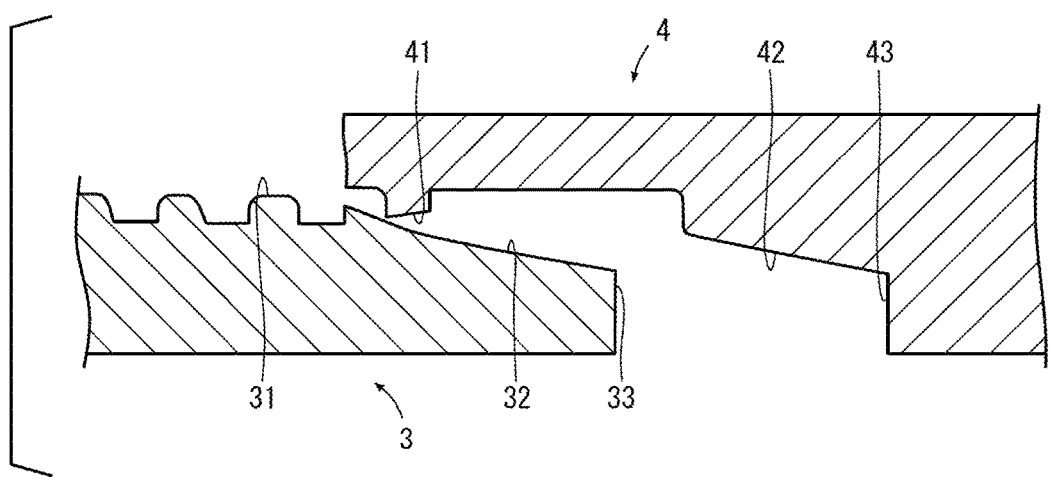
FIG. 9 is a cross-sectional view of the threaded connection for pipes.

FIG. 9 is a cross-sectional view of the threaded connection for pipes. Referring to FIG. 9, the pin 3 includes the pin side thread part 31, the pin side metal seal part 32, and the pin side shoulder part 33. The box 4 includes the box side thread part 41, the box side metal seal part 42, and the box side shoulder part 43.

In the pin 3 illustrated in FIG. 9, the pin side shoulder part 33, the pin side metal seal part 32, and the pin side thread part 31 are arranged in this order from the end of the steel pipe 1. Further, in the box 4, the box side thread part 41, the box side metal seal part 42, and the box side shoulder part 43 are arranged in this order from the end of the steel pipe 1 or the coupling 2. However, the arrangements of the pin side thread part 31 and the box side thread part 41, the pin side metal seal part 32 and the box side metal seal part 42, and the pin side shoulder part 33 and the box side shoulder part 43 are not limited to the arrangements illustrated in FIG. 9, and may be modified as appropriate. For example, as illustrated in FIG. 8, in the pin 3, the pin side metal seal part, the pin side thread part, the pin side metal seal part, the pin side shoulder part, the pin side metal seal part, and the pin side thread part may be arranged in this order from the end of the steel pipe 1. In the box 4, the box side metal seal part, the box side thread part, the box side metal seal part, the box side shoulder part, the box side metal seal part, and the box side thread part may be arranged in this order from the end of the steel pipe 1 or the coupling 2.

Figure 10:
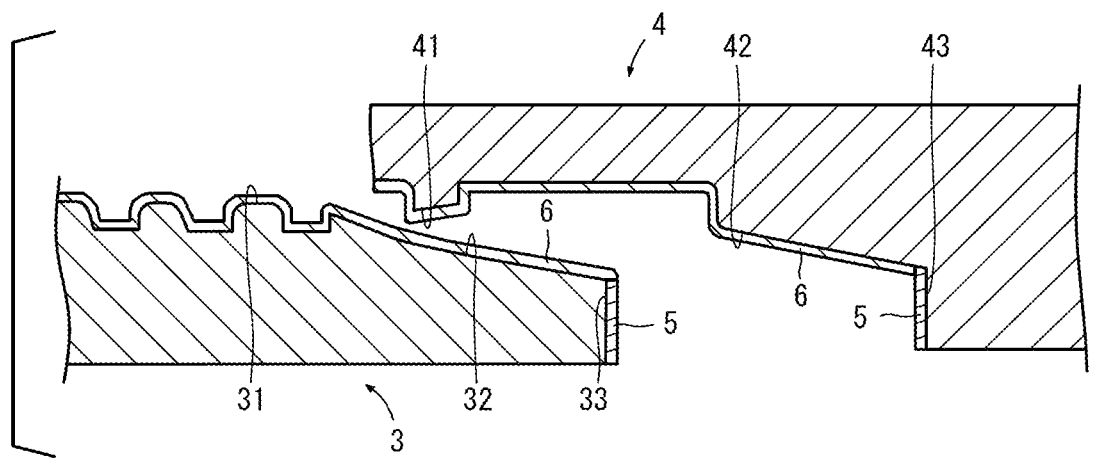
FIG. 10 is a cross-sectional view of a threaded connection for pipes according to the present embodiment.

FIG. 10 is a cross-sectional view of the threaded connection for pipes according to the present embodiment. Referring to FIG. 10, the threaded connection for pipes according to the present embodiment further includes shoulder part plating layers 5 and non-shoulder part plating layers 6.

[Shoulder Part Plating Layer]

The shoulder part plating layer 5 according to the present embodiment is arranged on the pin side shoulder part 33 and/or the box side shoulder part 43. Referring to FIG. 10, the shoulder part plating layer 5 may be arranged on both the pin side shoulder part 33 and the box side shoulder part 43.

Figure 11:
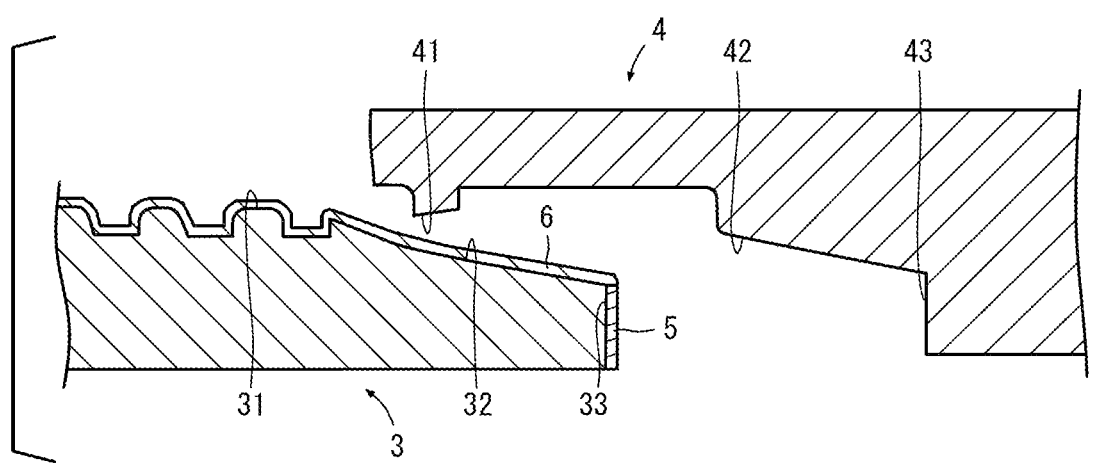
FIG. 11 is a cross-sectional view of a threaded connection for pipes according to another embodiment, the threaded connection for pipes being different from that illustrated in FIG. 10.
Figure 12:
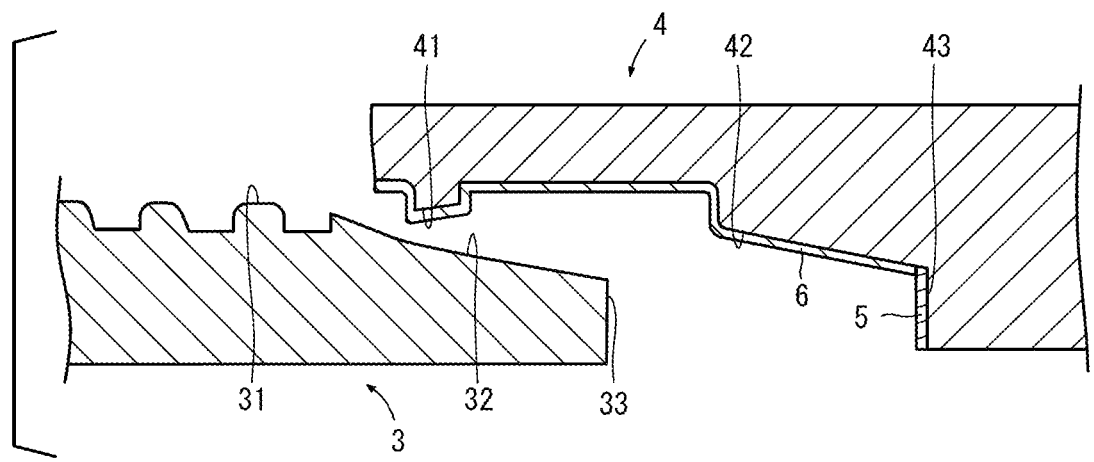
FIG. 12 is a cross-sectional view of a threaded connection for pipes according to another embodiment, the threaded connection for pipes being different from those illustrated in FIG. 10 and FIG. 11.
Figure 13:
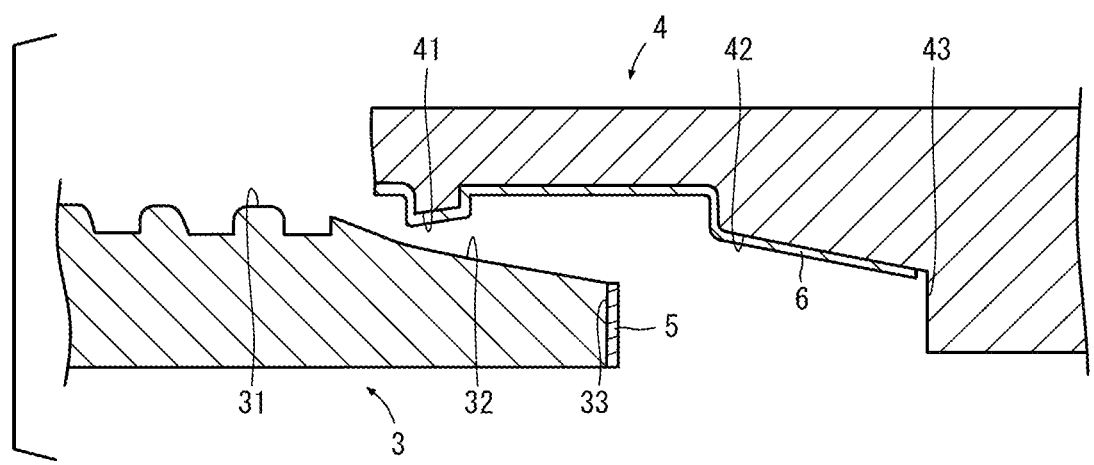
FIG. 13 is a cross-sectional view of a threaded connection for pipes according to another embodiment, the threaded connection for pipes being different from those illustrated in FIG. 10 to FIG. 12.

The shoulder part plating layer 5 according to the preset embodiment may be also arranged on the pin side shoulder part 33 or the box side shoulder part 43. FIG. 11 is a cross-sectional view of a threaded connection for pipes according to another embodiment, the threaded connection for pipes being different from that illustrated in FIG. 10. FIG. 12 is a cross-sectional view of a threaded connection for pipes according to another embodiment, the threaded connection for pipes being different from those illustrated in FIG. 10 and FIG. 11. FIG. 13 is a cross-sectional view of a threaded connection for pipes according to another embodiment, the threaded connection for pipes being different from those illustrated in FIG. 10 to FIG. 12. Referring to FIG. 11 and FIG. 13, the shoulder part plating layer 5 may be arranged only on the pin side shoulder part 33. Referring to FIG. 12, the shoulder part plating layer 5 may be arranged only on the box side shoulder part 43.

Figure 14:
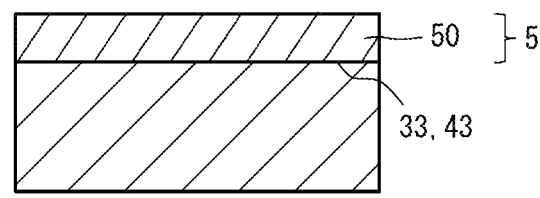
FIG. 14 is an enlarged view of a shoulder part plating layer according to the present embodiment.
Figure 15:
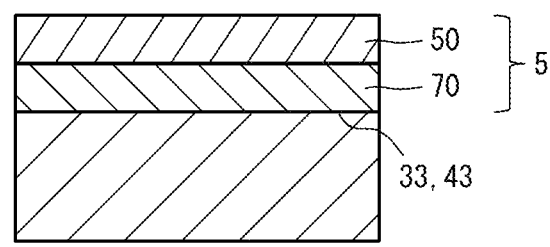
FIG. 15 is an enlarged view of a shoulder part plating layer according to another embodiment, the shoulder part plating layer being different from that illustrated in FIG. 14.

The shoulder part plating layer 5 according to the present embodiment includes one or more layers. FIG. 14 is an enlarged view of the shoulder part plating layer 5 according to the present embodiment. Referring to FIG. 14, the shoulder part plating layer 5 may be composed of one layer. In this case, the shoulder part plating layer 5 is a high friction coefficient plating layer 50. FIG. 15 is an enlarged view of the shoulder part plating layer 5 according to another embodiment, the shoulder part plating layer 5 being different from that illustrated in FIG. 14. Referring to FIG. 15, the shoulder part plating layer 5 may be composed of the plurality of layers. In this case, the outermost layer of the shoulder part plating layer 5 is a high friction coefficient plating layer 50. As illustrated in FIG. 15, the shoulder part plating layer 5 includes an optional plating layer 70 below the high friction coefficient plating layer 50. Further, the optional plating layer 70 may be a plurality of plating layers stacked.

[High Friction Coefficient Plating Layer]

The coefficient of friction of the high friction coefficient plating layer 50 is higher than the coefficient of friction of a low friction coefficient plating layer 60 described later. The pin side shoulder part 33 and the box side shoulder part 43 frictionally slide while receiving a high interfacial pressure at a final stage of fastening. Accordingly, when the outermost layer of the shoulder part plating layer 5 on the pin side shoulder part 33 and/or the box side shoulder part 43 is the high friction coefficient plating layer 50, a high torque can be obtained at a final stage of the fastening. As a result, a yield torque Ty is increased. The coefficient of friction of the high friction coefficient plating layer 50 is not particularly limited provided that the coefficient of friction of the high friction coefficient plating layer 50 is higher than the coefficient of friction of the low friction coefficient plating layer 60. The preferable lower limit of the coefficient of friction of the high friction coefficient plating layer 50 is 0.10, more preferably is 0.11, further preferably is 0.12, and further more preferably is 0.13. The preferable upper limit of the coefficient of friction of the high friction coefficient plating layer 50 is 0.40, more preferably is 0.30, and further preferably is 0.20. The coefficient of friction of the high friction coefficient plating layer 50 can be adjusted as changing the composition of the high friction coefficient plating layer 50, for example.

In the present embodiment, the high friction coefficient plating layer 50 may be a plating layer made of single metal, or may be an alloy plating layer. Further, in the present embodiment, the chemical composition of the high friction coefficient plating layer 50 is not particularly limited. The chemical composition of the high friction coefficient plating layer 50 can be selected from the chemical compositions of well-known plating layers. For example, the high friction coefficient plating layer 50 may be selected from a group consisting of a Cu plating layer, a Cr plating layer, a Zn plating layer, a Ni plating layer, a Cu—Sn alloy plating layer, a Zn—Co alloy plating layer, a Zn—Ni alloy plating layer, a Ni—P alloy plating layer, and a Cu—Sn—Zn alloy plating layer. The high friction coefficient plating layer 50 may be selected from a group consisting of a Ni—P alloy plating layer, a Zn—Ni alloy plating layer, a Cu plating layer, and a Cr plating layer. The high friction coefficient plating layer 50 may be selected from a group consisting of a Ni—P alloy plating layer, and a Zn—Ni alloy plating layer.

Figure 16:
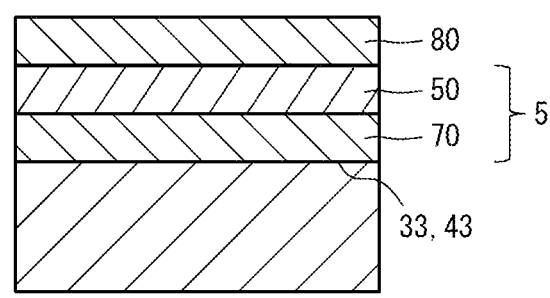
FIG. 16 is an enlarged view of a shoulder part plating layer according to another embodiment, the shoulder part plating layer being different from those illustrated in FIG. 14 and FIG. 15.

As described above, in a case where the shoulder part plating layer 5 includes the plurality of layers, the high friction coefficient plating layer 50 is arranged on the outermost layer of the shoulder part plating layer 5. However, the high friction coefficient plating layer 50 may not be arranged on the outermost layer of the pin side shoulder part 33 and/or the box side shoulder part 43. FIG. 16 is an enlarged view of the shoulder part plating layer 5 according to another embodiment, the shoulder part plating layer 5 being different from those illustrated in FIG. 14 and FIG. 15. Referring to FIG. 16, the lubricant coating 80 may be arranged on the shoulder part plating layer 5. The lubricant coating 80 will be described later.

[Non-Shoulder Part Plating Layer]

The non-shoulder part plating layer 6 according to the present embodiment is arranged on at least one of the pin side thread part 31, the pin side metal seal part 32, the box side thread part 41, and the box side metal seal part 42. Referring to FIG. 10, the non-shoulder part plating layer 6 is arranged on all of the pin side thread part 31, the pin side metal seal part 32, the box side thread part 41, and the box side metal seal part 42.

The non-shoulder part plating layer 6 may be arranged on part of the pin side thread part 31, the pin side metal seal part 32, the box side thread part 41, and the box side metal seal part 42. Referring to FIG. 11, the non-shoulder part plating layer 6 may be arranged on only the pin side thread part 31 and the pin side metal seal part 32. Referring to FIG. 12 and FIG. 13, the non-shoulder part plating layer 6 may be arranged on only the box side thread part 41 and the box side metal seal part 42.

Further, the non-shoulder part plating layer 6 may be arranged on only the pin side thread part 31 and the box side thread part 41. The non-shoulder part plating layer 6 may be arranged on only the pin side metal seal part 32 and the box side metal seal part 42. Accordingly, the non-shoulder part plating layer 6 may be arranged on at least one of the pin side thread part 31, the pin side metal seal part 32, the box side thread part 41, and the box side metal seal part 42.

Figure 17:
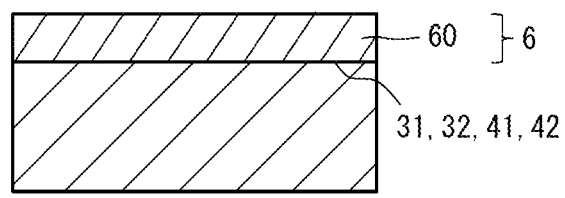
FIG. 17 is an enlarged view of a non-shoulder part plating layer according to the present embodiment.
Figure 18:
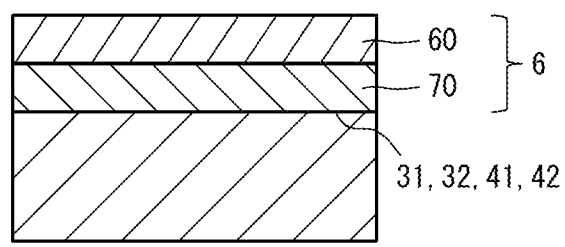
FIG. 18 is an enlarged view of a non-shoulder part plating layer according to another embodiment, the non-shoulder part plating layer being different from that illustrated in FIG. 17.

The non-shoulder part plating layer 6 according to the present embodiment includes one or more layers. FIG. 17 is an enlarged view of the non-shoulder part plating layer 6 according to the present embodiment. Referring to FIG. 17, the non-shoulder part plating layer 6 may be composed of one layer. In this case, the non-shoulder part plating layer 6 is a low friction coefficient plating layer 60. FIG. 18 is an enlarged view of the non-shoulder part plating layer 6 according to another embodiment, the non-shoulder part plating layer 6 being different from that illustrated in FIG. 17. Referring to FIG. 18, the non-shoulder part plating layer 6 may be composed of the plurality of layers. In this case, the outermost layer of the non-shoulder part plating layer 6 is a low friction coefficient plating layer 60. As illustrated in FIG. 18, the non-shoulder part plating layer 6 includes an optional plating layer 70 below the low friction coefficient plating layer 60. Further, the optional plating layer 70 may be a plurality of plating layers stacked.

[Low Friction Coefficient Plating Layer]

The coefficient of friction of the low friction coefficient plating layer 60 according to the present embodiment is lower than the coefficient of friction of the high friction coefficient plating layer 50. The pin side thread part 31, the pin side metal seal part 32, the box side thread part 41 and the box side metal seal part 42 frictionally slide before shouldering of the fastening. Accordingly, if the outermost layer of the non-shoulder part plating layer 6 on at least one of the pin side thread part 31, the pin side metal seal part 32, the box side thread part 41, and the box side metal seal part 42 is the low friction coefficient plating layer 60, a low torque can be obtained at an initial stage of the fastening. As a result, a shouldering torque Ts can be maintained at a low level. The coefficient of friction of the low friction coefficient plating layer 60 is not particularly limited provided that the coefficient of friction of the low friction coefficient plating layer 60 is lower than the coefficient of friction of the high friction coefficient plating layer 50. The preferable lower limit of the coefficient of friction of the low friction coefficient plating layer 60 is 0.01, more preferably is 0.05, further preferably is 0.08, and further preferably is 0.10. The preferable upper limit of the coefficient of friction of the low friction coefficient plating layer 60 is less than 0.13, more preferably is 0.12, and further preferably is 0.11. The coefficient of friction of the low friction coefficient plating layer 60 can be adjusted as changing the composition of the low friction coefficient plating layer 60, for example.

The low friction coefficient plating layer 60 may be a plating layer made of single metal, or may be an alloy plating layer. Further, in the present embodiment, the chemical composition of the low friction coefficient plating layer 60 is not particularly limited. The chemical composition of the low friction coefficient plating layer 60 can be selected from the chemical compositions of well-known plating layers. For example, the low friction coefficient plating layer 60 may be selected from a group consisting of a Cu plating layer, a Cr plating layer, a Zn plating layer, a Ni plating layer, a Cu—Sn alloy plating layer, a Zn—Co alloy plating layer, a Zn—Ni alloy plating layer, a Ni—P alloy plating layer, and a Cu—Sn—Zn alloy plating layer. The low friction coefficient plating layer 60 may be selected from a group consisting of a Zn—Ni alloy plating layer, a Cu plating layer, a Cr plating layer, and a Zn plating layer. The low friction coefficient plating layer 60 may be selected from a group consisting of a Cu plating layer, a Cr plating layer, and a Zn plating layer.

Figure 19:
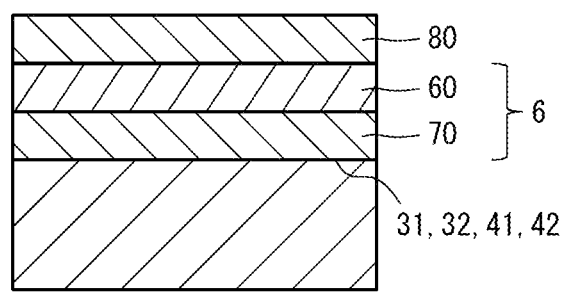
FIG. 19 is an enlarged view of a non-shoulder part plating layer according to another embodiment, the non-shoulder part plating layer being different from those illustrated in FIG. 17 and FIG. 18.

As described above, in a case where the non-shoulder part plating layer 6 includes the plurality of layers, the low friction coefficient plating layer 60 is arranged on the outermost layer of the non-shoulder part plating layer 6. However, the low friction coefficient plating layer 60 may not be arranged on the outermost layer of the pin side thread part 31, the pin side metal seal part 32, the box side thread part 41, and the box side metal seal part 42. FIG. 19 is an enlarged view of the non-shoulder part plating layer 6 according to another embodiment, the non-shoulder part plating layer 6 being different from those illustrated in FIG. 17 and FIG. 18. Referring to FIG. 19, the lubricant coating 80 may be arranged on the non-shoulder part plating layer 6. The lubricant coating 80 will be described later.

[Coefficient of Friction of the High Friction Coefficient Plating Layer and the Low Friction Coefficient Plating Layer]

In the present embodiment, the coefficient of friction of the high friction coefficient plating layer 50 and the coefficient of friction of the low friction coefficient plating layer 60 are measured by the following method. Samples on which the high friction coefficient plating layer 50 or the low friction coefficient plating layer 60 is formed are prepared. The Bowden sliding test is conducted on the high friction coefficient plating layer 50 or the low friction coefficient plating layer 60. The Bowden sliding test is conducted under the following conditions: sliding indenter: 3/16" (4.7625 mm in diameter) steel ball (Fe, steel grade SUJ2), pressing load: 3 kgf, sliding method: linear reciprocating sliding, sliding length: 30 mm, number of sliding reciprocations: 5, sliding speed: 4 mm/sec, test temperature: 25° C., lubricant: SEAL-GUARD ECF (trade name) made by JET-LUBE Inc., amount of lubricant application: 40 $g/m^2$. For each of the plating layers, an arithmetic average of coefficients of friction for five sliding reciprocations is determined as its coefficient of friction.

[Optional Plating Layer]

In the present embodiment, the optional plating layer 70 may be formed, and may not be formed. Further, the optional plating layer 70 includes one or more layers. In the present embodiment, the optional plating layer 70 may be a plating layer made of single metal, or may be an alloy plating layer. That is, in the present embodiment, the chemical composition of the optional plating layer 70 is not particularly limited. The chemical composition of the optional plating layer 70 can be selected from the chemical compositions of well-known plating layers. For example, the optional plating layer 70 may be selected from a group consisting of a Cu plating layer, a Cr plating layer, a Zn plating layer, a Ni plating layer, a Cu—Sn alloy plating layer, a Zn—Co alloy plating layer, a Zn—Ni alloy plating layer, a Ni—P alloy plating layer, and a Cu—Sn—Zn alloy plating layer.

The component of the optional plating layer 70 on the pin 3 side and the component of the optional plating layer 70 on the box 4 side may be equal to each other, or may differ from each other. The component of the optional plating layer 70 below the high friction coefficient plating layer 50 and the component of the optional plating layer 70 below the low friction coefficient plating layer 60 may be equal to each other, or may differ from each other. The chemical composition of the optional plating layer 70 on the pin 3 side and the chemical composition of the optional plating layer 70 on the box 4 side may be equal to each other, or may differ from each other. The chemical composition of the optional plating layer 70 below the high friction coefficient plating layer 50 and the chemical composition of the optional plating layer 70 below the low friction coefficient plating layer 60 may be equal to each other, or may differ from each other.

[Arrangements of Shoulder Part Plating Layer and Non-Shoulder Part Plating Layer]

The arrangements of the shoulder part plating layer 5 and the non-shoulder part plating layer 6 are not limited to the arrangement illustrated in FIG. 10. For example, referring to FIG. 11, the shoulder part plating layer 5 may be arranged on the pin side shoulder part 33, and the non-shoulder part plating layer 6 may be arranged on the pin side thread part 31 and the pin side metal seal part 32. In this case, nothing may be arranged on the box side shoulder part 43, the box side metal seal part 42, and the box side thread part 41, or a lubricant coating 80 described later may be arranged on or above the box side shoulder part 43, the box side metal seal part 42, and the box side thread part 41, or a chemical conversion treatment layer such as a phosphate layer may be arranged on the box side shoulder part 43, the box side metal seal part 42, and the box side thread part 41.

Also, referring to FIG. 12, the shoulder part plating layer 5 may be arranged on the box side shoulder part 43, and the non-shoulder part plating layer 6 may be arranged on the box side thread part 41 and the box side metal seal part 42. In this case, nothing may be arranged on the pin side shoulder part 33, the pin side metal seal part 32, and the pin side thread part 31, or the lubricant coating 80 described later may be arranged on or above the pin side shoulder part 33, the pin side metal seal part 32, and the pin side thread part 31, or a chemical conversion treatment layer such as a phosphate layer may be arranged on the pin side shoulder part 33, the pin side metal seal part 32, and the pin side thread part 31. Further, referring to FIG. 13, the shoulder part plating layer 5 may be arranged on the pin side shoulder part 33, and the non-shoulder part plating layer 6 may be arranged on the box side thread part 41 and the box side metal seal part 42.

[Thickness of Plating Layer]

The thickness of the shoulder part plating layer 5 is not particularly limited. The preferable thickness of the shoulder part plating layer 5 is 1 to 50 μm. In this case, it is possible to more stably obtain an advantageous effect of increasing the yield torque Ty. More preferable lower limit of the thickness of the shoulder part plating layer 5 is 3 μm, and further preferably is 5 μm. More preferable upper limit of the thickness of the shoulder part plating layer 5 is 40 μm, and further preferably is 25 μm.

The thickness of the non-shoulder part plating layer 6 is not particularly limited. The preferable thickness of the non-shoulder part plating layer 6 is 1 to 50 μm. In this case, it is possible to more stably obtain an advantageous effect of maintaining the shouldering torque Ts at a low level. More preferable lower limit of the thickness of the non-shoulder part plating layer 6 is 3 μm, and further preferably is 5 μm. More preferable upper limit of the thickness of the non-shoulder part plating layer 6 is 40 μm, and further preferably is 25 μm.

[Combination of the High Friction Coefficient Plating Layer and the Low Friction Coefficient Plating Layer]

In the present embodiment, the combination of the chemical composition of the high friction coefficient plating layer 50 and the chemical composition of the low friction coefficient plating layer 60 is not particularly limited provided that the coefficient of friction of the high friction coefficient plating layer 50 is higher than the coefficient of friction of the low friction coefficient plating layer 60. The combination of the chemical composition of the high friction coefficient plating layer 50 and the chemical composition of the low friction coefficient plating layer 60 is as follows, for example. In the case where the high friction coefficient plating layer 50 is a Ni—P alloy plating layer, the low friction coefficient plating layer 60 is selected from a group consisting of a Cu plating layer, a Cr plating layer, a Zn plating layer, a Ni plating layer, a Cu—Sn alloy plating layer, a Zn—Co alloy plating layer, a Zn—Ni alloy plating layer, and a Cu—Sn—Zn alloy plating layer. In the case where the high friction coefficient plating layer 50 is a Zn—Ni alloy plating layer, the low friction coefficient plating layer 60 is selected from a group consisting of a Cu plating layer, a Cr plating layer, a Zn plating layer, a Ni plating layer, a Cu—Sn alloy plating layer, a Zn—Co alloy plating layer, and a Cu—Sn—Zn alloy plating layer. The chemical compositions of the high friction coefficient plating layer 50, the low friction coefficient plating layer 60 and the optional plating layer 70 can be appropriately selected from the chemical compositions of well-known plating layers.

In the case where the low friction coefficient plating layer 60 is a Cu plating layer, the high friction coefficient plating layer 50 is selected from a group consisting of a Ni plating layer, a Cu—Sn alloy plating layer, a Zn—Co alloy plating layer, a Zn—Ni alloy plating layer, a Ni—P alloy plating layer, and a Cu—Sn—Zn alloy plating layer. In the case where the low friction coefficient plating layer 60 is a Cr plating layer, the high friction coefficient plating layer 50 is selected from a group consisting of a Cu plating layer, a Ni plating layer, a Cu—Sn alloy plating layer, a Zn—Co alloy plating layer, a Zn—Ni alloy plating layer, a Ni—P alloy plating layer, and a Cu—Sn—Zn alloy plating layer. In the case where the low friction coefficient plating layer 60 is a Zn plating layer, the high friction coefficient plating layer 50 is selected from a group consisting of a Cr plating layer, a Cu plating layer, a Ni plating layer, a Cu—Sn alloy plating layer, a Zn—Co alloy plating layer, a Zn—Ni alloy plating layer, a Ni—P alloy plating layer, and a Cu—Sn—Zn alloy plating layer.

It is preferable that the high friction coefficient plating layer 50 is selected from a group consisting of a Ni—P alloy plating layer, a Zn—Ni alloy plating layer, a Cu plating layer, a Cr plating layer, and a Cu—Sn—Zn alloy plating layer. It is preferable that the low friction coefficient plating layer 60 is selected from a group consisting of a Zn—Ni alloy plating layer, a Cu plating layer, a Cr plating layer, a Cu—Sn—Zn alloy plating layer and a Zn plating layer. Therefore, it is preferable that the combination of the chemical composition of the high friction coefficient plating layer 50 and the chemical composition of the low friction coefficient plating layer 60 is the following (1) to (5):

(1) In the case where the high friction coefficient plating layer 50 is a Ni—P alloy plating layer, the low friction coefficient plating layer 60 is selected from a group consisting of a Zn—Ni alloy plating layer, a Cu plating layer, a Cr plating layer, a Cu—Sn—Zn alloy plating layer, and a Zn plating layer;

(2) In the case where the high friction coefficient plating layer 50 is a Zn—Ni alloy plating layer, the low friction coefficient plating layer 60 is selected from a group consisting of a Cu plating layer, a Cr plating layer, a Cu—Sn—Zn alloy plating layer, and a Zn plating layer;

(3) In the case where the high friction coefficient plating layer 50 is a Cu plating layer, the low friction coefficient plating layer 60 is selected from a group consisting of a Cr plating layer, a Cu—Sn—Zn alloy plating layer, and a Zn plating layer;

(4) In the case where the high friction coefficient plating layer 50 is a Cr plating layer, the low friction coefficient plating layer 60 is selected from a group consisting of a Cu—Sn—Zn alloy plating layer, and a Zn plating layer;

(5) In the case where the high friction coefficient plating layer 50 is a Cu—Sn—Zn alloy plating layer, the low friction coefficient plating layer 60 is a Zn plating layer.

[Chemical Composition of the Plating Layers]

The chemical composition of each plating layer is as follows, for example. The Cu plating layer is a plating layer having the chemical composition consisting of Cu and impurities. The Cr plating layer is a plating layer having the chemical composition consisting of Cr and impurities. The Zn plating layer is a plating layer having the chemical composition consisting of Zn and impurities. The Ni plating layer is a plating layer having the chemical composition consisting of Ni and impurities. The Cu—Sn alloy plating layer is a plating layer having the chemical composition consisting of Sn: 10 to 75%, and the balance: Cu and impurities. The Zn—Co alloy plating layer is a plating layer having the chemical composition consisting of Co: 5 to 25%, and the balance: Zn and impurities. The Zn—Ni alloy plating layer is a plating layer having the chemical composition consisting of Ni: 5 to 25%, and the balance: Zn and impurities. The Ni—P alloy plating layer is a plating layer having the chemical composition consisting of P: 0.1 to 20%, and the balance: Ni and impurities. The Cu—Sn—Zn alloy plating layer is a plating layer having the chemical composition consisting of Sn: 20 to 60%, Zn: 3 to 30%, and the balance: Cu and impurities.

In the present embodiment, the chemical compositions of the plating layers can be measured by the following method. The chemical composition is measured using a handheld fluorescent X-ray analyzer (DP2000 (trade name DELTA Premium) made by JEOL Ltd.). In measuring the chemical composition, the composition is analyzed at four points on the surface of the high friction coefficient plating layer 50, or the low friction coefficient plating layer 60, or the optional plating layer 70 (four points consisting of 0°, 90°, 180°, 270° in the tube circumferential direction of the threaded connection for pipes). The chemical composition is analyzed in an Alloy Plus mode.

[Lubricant Coating]

The threaded connection for pipes may further include the lubricant coating 80. Referring to FIG. 16, the lubricant coating 80 may be arranged on the shoulder part plating layer 5. Referring to FIG. 19, the lubricant coating 80 may be arranged on the non-shoulder part plating layer 6. However, the arrangement of the lubricant coating 80 is not limited to the arrangements illustrated in FIG. 16 and FIG. 19. It is sufficient that the lubricant coating 80 be arranged as an outermost layer on or above at least one of the pin side thread part 31, the pin side metal seal part 32, the pin side shoulder part 33, the box side thread part 41, the box side metal seal part 42, and the box side shoulder part 43. That is, in the case where the shoulder part plating layer 5 is not formed, the lubricant coating 80 may be directly arranged on the pin side shoulder part 33 or the box side shoulder part 43. In the case where the non-shoulder part plating layer 6 is not formed, the lubricant coating 80 may be directly arranged on at least one of the pin side thread part 31, the pin side metal seal part 32, the box side thread part 41, and the box side metal seal part 42. The lubricant coating 80 may be arranged on or above the entire of the pin side thread part 31, the pin side metal seal part 32, and the pin side shoulder part 33 as the outermost layer. The lubricant coating 80 may be arranged on or above the entire of the box side thread part 41, the box side metal seal part 42, and the box side shoulder part 43 as the outermost layer. In the case where the threaded connection for pipes includes the lubricant coating 80 as an outermost layer, lubricity of the threaded connection for pipes is increased.

The lubricant coating 80 is in the liquid form or in the semi-solid form. The liquid form means a state which has a certain volume, but does not have a certain shape. The semi-solid form means a state which loses flowability in a static state, but which can acquire flowability when receiving a force (pressure, heat or the like) from the outside. The liquid form or the semi-solid form includes a highly viscous substance, such as grease. A well-known lubricant may be used as the lubricant coating 80. The lubricant coating 80 contains lubricating particles, basic aromatic organic acid metal salt, rosin, metal soap, and wax, for example. The lubricant coating 80 may contain solvent and other components as necessary.

The lubricating particles are not particularly limited provided that the lubricating particles are particles having lubricity. The lubricating particles are one or more types selected from a group consisting of graphite, $MoS_2$ (molybdenum disulfide), $WS_2$ (tungsten disulfide), BN (boron nitride), PTFE (polytetrafluoroethylene), $CF_x$ (graphite fluoride), and $CaCO_3$ (calcium carbonate), for example. Assuming the total of all components of the lubricant coating 80 except for the solvent as 100%, content of lubricating particles is 1 to 20%, for example.

Basic aromatic organic acid metal salt is salt made of aromatic organic acid and excess alkali (alkali metal or alkaline earth metal). Assuming the total of all components of the lubricant coating 80 except for the solvent as 100%, content of basic aromatic organic acid metal salt is 40 to 90%, for example.

Rosin is a natural resin which contains abietic acid, indicated by $C_{20}H_{30}O_2$, as a main component. Assuming the total of all components of the lubricant coating 80 except for the solvent as 100%, content of rosin is 5 to 30%, for example. Metal soap is metal salt of fatty acid. Assuming the total of all components of the lubricant coating 80 except for the solvent as 100%, content of metal soap is 2 to 30%, for example. Wax means an organic matter which is in the solid form at a room temperature, and which is converted into the liquid form when heated. Assuming the total of all components of the lubricant coating 80 except for the solvent as 100%, content of wax is 2 to 30%, for example.

The lubricant coating 80 may contain a solvent, such as water or organic solvent. The lubricant coating 80 may contain 10% or less of known rust preventive additive, preservative, color pigment and the like in total.

A commercially available lubricant may be used as the lubricant coating 80. The commercially available lubricant may be SEAL-GUARD ECF (trade name) made by JET-LUBE Inc., for example. The chemical composition of the lubricant coating 80 formed on or above the pin 3 side and the chemical composition of the lubricant coating 80 formed on or above the box 4 side may be equal to each other, or may differ from each other.

The thickness of the lubricant coating 80 is not particularly limited. The thickness of the lubricant coating 80 is 10 to 300 μm, for example. When the thickness of the lubricant coating 80 is 10 μm or more, lubricity of the threaded connection for pipes is stably increased. Even if the thickness of the lubricant coating 80 becomes more than 300 μm, an excess of the lubricant coating 80 is removed at the time of fastening so that the aforementioned advantageous effects saturate.

The thickness of the lubricant coating 80 can be measured by the following method. The pin 3 or the box 4 including the lubricant coating 80 is prepared. An arbitrary measurement portion (area: 5 mm×20 mm) of the lubricant coating 80 is wiped with absorbent cotton impregnated with ethanol. The amount (g) of the lubricant coating 80 is calculated from a difference between the weight of the absorbent cotton before wiping and the weight of the absorbent cotton after wiping. The average thickness of the lubricant coating 80 is calculated from the amount (g) of the lubricant coating 80, the density (g/cm$^3$) of the lubricant coating 80, and the area of the measurement portions, and the average thickness of the lubricant coating 80 is used as the thickness (μm) of the lubricant coating 80.

[Base Metal of Threaded Connection for Pipes]

The chemical composition of base metal of the threaded connection for pipes according to the present embodiment is not particularly limited. The base metal may be carbon steel, stainless steel, alloy steel or the like, for example. Of alloy steel, high alloy steel, such as duplex stainless steel and a Ni alloy, which contains alloying elements, such as Cr, Ni and Mo has high corrosion resistance. Accordingly, when the high alloy steel is used as base metal, corrosion resistance of the threaded connection for pipes can be increased.

[Production Method]

The threaded connection for pipes according to the present embodiment can be produced by the following method, for example. The production method includes a plating layer forming step. In the plating layer forming step, the high friction coefficient plating layer 50 and the low friction coefficient plating layer 60 are formed. The high friction coefficient plating layer 50 and the low friction coefficient plating layer 60 can be produced by a masking method or a brush plating method, for example. Hereinafter, as one example, a production method will be described where a Zn—Ni alloy plating layer is formed as the high friction coefficient plating layer 50, and a Cu plating layer is formed as the low friction coefficient plating layer 60.

[Plating Layer Forming Step]

In the case where the threaded connection for pipes according to the present embodiment is produced by the masking method, the threaded connection for pipes can be produced through the following procedure. Hereunder, to describe the plating layer forming step specifically, it will be described in a case where a Cu plating layer is formed on the pin side thread part 31, the pin side metal seal part 32, the box side thread part 41, and the box side metal seal part 42, and a Zn—Ni alloy plating layer is formed on the pin side shoulder part 33 and the box side shoulder part 43. First, two kinds of plating solutions are prepared. The two kinds of plating solutions are a plating solution for forming the Zn—Ni alloy plating layer and a plating solution for forming the Cu plating layer, for example. The plating solution for forming the Zn—Ni alloy plating layer contains zinc ion and nickel ion. The concentrations of metal ions are as follows, for example: zinc ion: 1 to 100 g/L, nickel ion: 1 to 150 g/L. A commercially available plating bath may be used as the plating solution for forming the Cu plating layer, for example. The plating solution for forming the Cu plating layer is DAIN COPPER LS-001 (trade name) made by Daiwa Fine Chemicals Co, Ltd., for example.

Next, the pin 3 and/or the box 4 are immersed into the plating solution for forming the Cu plating layer. Specifically, the pin 3 or the box 4 is energized to form the Cu plating layer on the pin side shoulder part 33, the pin side metal seal part 32 and the pin side thread part 31 and the box side shoulder part 43, the box side metal seal part 42 and the box side thread part 41. The conditions for the electroplating may be appropriately set. The conditions for the electroplating are as follows, for example: plating solution pH: 1 to 10, plating solution temperature: 10 to 60° C., current density: 1 to 100 A/dm$^2$, and treatment duration: 0.1 to 250 minutes. With such operations, the Cu plating layer which corresponds to the low friction coefficient plating layer 60 is formed on the entire surface of the pin 3 and/or the entire surface of the box 4.

Subsequently, a mask is formed on the pin side metal seal part 32 and the pin side thread part 31 and/or the box side metal seal part 42 and the box side thread part 41 on which the Cu plating layer which corresponds to the low friction coefficient plating layer 60 is formed. The mask can be formed by a well-known method. Specifically, the pin side metal seal part 32, the pin side thread part 31, the box side metal seal part 42, and the box side thread part 41 may be adhered an aluminum tape so as to be masked, or may be covered by a caulking agent so as to be masked.

The pin 3 on which the mask is formed and/or the box 4 on which the mask is formed are immersed into the plating solution for forming the Zn—Ni alloy plating layer. The pin 3 and/or the box 4 are energized to form the Zn—Ni alloy plating layer. Specifically, the mask is formed on the pin side metal seal part 32, the pin side thread part 31, the box side metal seal part 42, and the box side thread part 41 and hence, the Zn—Ni alloy plating layer is formed only on the pin side shoulder part 33 and the box side shoulder part 43 on which no mask is formed. The conditions for the electroplating may be appropriately set. The conditions for the electroplating are as follows, for example: plating solution pH: 1 to 10, plating solution temperature: 10 to 60° C., current density: 1 to 100 A/dm$^2$, and treatment duration: 0.1 to 250 minutes. With such operations, the Zn—Ni alloy plating layer which corresponds to the high friction coefficient plating layer 50 is formed on the pin side shoulder part 33 and the box side shoulder part 43. The mask may be removed at the end.

In the case where the threaded connection for pipes is produced by a brush method, the threaded connection for pipes is produced through the following procedure. First, in the same manner as the aforementioned masking method, two kinds of plating solutions are prepared. The two kinds of plating solutions are a plating solution for forming the Cu plating layer and a plating solution for forming the Zn—Ni alloy plating layer, for example.

Next, in the same manner as the aforementioned masking method, the Cu plating layer is formed on the pin side shoulder part 33, the pin side metal seal part 32 and the pin side thread part 31 and/or the box side shoulder part 43, the box side metal seal part 42, and the box side thread part 41.

Subsequently, a brush where absorbent cotton is wrapped around an electrode is prepared. The absorbent cotton is immersed into a plating solution for forming the Zn—Ni alloy plating layer to cause the absorbent cotton to be impregnated with the plating solution. The absorbent cotton impregnated with the plating solution and the electrode are caused to come into contact with the pin side shoulder part 33 and/or the box side shoulder part 43, and are energized. With such operations, the Zn—Ni alloy plating layer can be formed on the pin side shoulder part 33 and/or the box side shoulder part 43. Conditions for electroplating can be appropriately set. The conditions for the electroplating are as follows: plating solution pH: 1 to 10, plating solution temperature: 10 to 60° C., current density: 1 to 100 A/dm$^2$, and treatment duration: 0.1 to 200 minutes, for example. With such operations, the Zn—Ni alloy plating layer which corresponds to the high friction coefficient plating layer 50 is formed on the pin side shoulder part 33 and/or the box side shoulder part 43.

After the respective plating layers are formed, washing with water or drying may be performed as necessary. In the case of forming the optional plating layer 70, the pin 3 or the box 4 is immersed into the plating solution for forming the optional plating layer 70 before the aforementioned Cu plating layer is formed, thus forming the optional plating layer 70. Conditions for forming the optional plating layer 70 may be appropriately set.

The threaded connection for pipes of the present embodiment can be produced through the aforementioned steps. In the aforementioned description of the production method, the case has been described where the Zn—Ni alloy plating layer is formed as the high friction coefficient plating layer 50, and the Cu plating layer is formed as the low friction coefficient plating layer 60. However, different plating layers may be formed as the high friction coefficient plating layer 50 and the low friction coefficient plating layer 60. In such a case, a plating bath which contains metal ion to be contained in the plating layer to be formed may be used to produce the plating layer same as the aforementioned production method.

[Lubricant Coating Forming Step]

A lubricant coating forming step may be conducted after the aforementioned plating layer is formed. In the lubricant coating forming step, the lubricant coating 80 is formed as the outermost layer on or above at least one of the pin side shoulder part 33, the pin side metal seal part 32, the pin side thread part 31, the box side shoulder part 43, the box side metal seal part 42 and the box side thread part 41.

The lubricant coating 80 can be formed by applying composition containing the aforementioned components on or above at least one of the aforementioned pin side shoulder part 33, the pin side metal seal part 32, the pin side thread part 31, the box side shoulder part 43, the box side metal seal part 42, and the box side thread part 41. The coating method is not particularly limited. The coating method may be, for example, spray coating, brush coating or immersing. In the case where the spray coating is adopted, composition containing the aforementioned components may be heated, and may be sprayed in a state where flowability is increased. The film forming step may be performed on both or either one of the pin 3 and the box 4.

[Preconditioning Treatment Step]

The aforementioned production method may include a preconditioning treatment step before the plating layer forming step when necessary. The preconditioning treatment step may be pickling and alkaline degreasing, for example. In the preconditioning treatment step, oil and the like adhering to the contact surface are washed. The preconditioning treatment step may further include grinding, such as sand blasting and machine grinding finishing. One of these preconditioning treatments may be performed, or the plurality of preconditioning treatments may be performed in combination.

EXAMPLES

Hereinafter, examples will be described. In the example, "%" means mass %.

[Plating Layer Forming Step]

Various plating layers were each formed on a surface of a steel plate made of carbon steel, and their friction coefficients were measured. SPCC (JIS G3141(2017)) made by Paltec Test Panels co., ltd was used for the steel plate. The composition of the steel plate was as followed: C≤0.15%, Mn≤0.60%, P≤0.100%, and S≤0.050%. The plating layers were formed on the surface of the steel plate under the following conditions.

Ni—P Alloy Plating Layer

On a surface of a steel plate, a Ni—P alloy plating layer having a thickness of 10 μm was formed using a plating solution (trade name) SEK797 made by Japan Kanigen co., Ltd. Conditions for the plating were as followed: a plating solution temperature: 90° C. and a treatment duration: 40 minutes (electroless plating). The Ni—P alloy plating layer had the chemical composition consisting of P: 5 to 15 mass %, and the balance: Ni and impurities.

Zn—Ni Alloy Plating Layer

On a surface of a steel plate, a Zn—Ni alloy plating layer having a thickness of 10 μm was formed using a plating solution (trade name) DAIN Zinalloy N-PL made by Daiwa Fine Chemicals Co., Ltd. Conditions for the plating were as followed: a plating solution temperature: 35° C., a current density: 4 A/dm$^2$, and a treatment duration: 15 minutes. The Zn—Ni alloy plating layer had the chemical composition consisting of Ni: 10 to 20 mass %, and the balance: Zn and impurities.

Cu Plating Layer

On a surface of a steel plate, a Cu plating layer having a thickness of 10 μm was formed using a plating solution made up by preparing commercial reagents. The plating solution contained 200 g/L of copper sulfate pentahydrate and 50 g/L of sulfuric acid. Conditions for the plating were as followed: a plating solution temperature: 35° C., a current density: 10 A/dm$^2$, and a treatment duration: 5 minutes. The Cu plating layer had the chemical composition consisting of Cu: 99 mass % or more, and the balance: impurities.

Zn Plating Layer

On a surface of a steel plate, a Zn plating layer having a thickness of 10 μm was formed using a plating solution made up by preparing commercial reagents. The plating solution contained 350 g/L of zinc sulfate heptahydrate and 75 g/L of sodium sulfate, and had pH: 2. Conditions for the plating were as followed: a plating solution temperature: 50° C., a current density: 10 A/dm$^2$, and a treatment duration: 4 minutes. The Zn plating layer had the chemical composition consisting of Zn: 99 mass % or more, and the balance: impurities.

Cu—Sn—Zn Alloy Plating Layer

On a surface of a steel plate, a Cu—Sn—Zn alloy plating layer having a thickness of 10 μm was formed using a plating solution made by NIHON KAGAKU SANGYO CO., LTD. Conditions for the plating were as followed: a plating solution pH: 14, a plating solution temperature: 45°

C., a current density: 2 A/dm$^2$, and a treatment duration: 40 minutes. The Cu—Sn—Zn alloy plating layer had the chemical composition consisting of Sn: 40 mass %, Zn: 7 mass %, and the balance: Cu and impurities.

pin side. A test number 7 was an example in which the Cu plating layer was formed on its entire surface, being equivalent to a conventional example. Results of the analysis are shown in Table 2.

TABLE 2

| | Kind of plating | | | Analytical value | | | Increase/decrease rate | | |
|---|---|---|---|---|---|---|---|---|---|
| Test No. | Thread part | Metal seal part | Shoulder part | Ts (ft. lbs) | Ty (ft. lbs) | ΔT (ft. lbs) | Ts (%) | Ty (%) | ΔT (%) |
| 1 | Cu plating layer | | Ni-P alloy plating layer | 17768 | 81807 | 64039 | 0.0 | 3.9 | 5.1 |
| 2 | Cu plating layer | | Zn-Ni alloy plating layer | 17767 | 81198 | 63431 | 0.0 | 3.2 | 4.1 |
| 3 | Cu plating layer | Ni-P alloy plating layer | | 19045 | 83538 | 64492 | 7.2 | 6.1 | 5.8 |
| 4 | Cu plating layer | Zn-Ni alloy plating layer | | 18981 | 83414 | 64434 | 6.9 | 6.0 | 5.7 |
| 5 | Cu plating layer | Zn plating layer | | 16258 | 73060 | 56801 | −8.5 | −7.2 | −6.8 |
| 6 | Cu plating layer | Cr plating layer | | 17304 | 76991 | 59687 | −2.6 | −2.2 | −2.1 |
| 7 | Cu plating layer | | | 17761 | 78709 | 60948 | 0.0 | 0.0 | 0.0 |
| 8 | Ni-P alloy plating layer | | | 19816 | 87712 | 67895 | 11.6 | 11.4 | 11.4 |
| 9 | Zn-Ni alloy plating layer | | | 19606 | 86801 | 67195 | 10.4 | 10.3 | 10.2 |

Cr Plating Layer

On a surface of a steel plate, a Cr plating layer having a thickness of 10 μm was formed using a Chromium plating solution made by SIFCO Industries, Inc. Conditions for the plating were as followed: a plating solution temperature: 40° C., a current density: 30 A/dm$^2$, and a treatment duration: 30 minutes. The Cr plating layer had the chemical composition consisting of Cr: 95 mass % or more, and the balance: impurities.

[Test of Measuring Coefficient of Friction]

The Bowden sliding test was conducted on the steel plates with the plating layers formed thereon to measure coefficients of friction of the plating layers. The Bowden sliding test was conducted under the following conditions: sliding indenter: ³⁄₁₆" (4.7625 mm in diameter) steel ball (Fe, steel grade SUJ2), pressing load:3 kgf, sliding method: linear reciprocating sliding, sliding length:30 mm, number of sliding reciprocations:5, sliding speed:4 mm/sec, test temperature: 25° C., lubricant:(trade name) SEAL-GUARD ECF made by JET-LUBE Inc., amount of lubricant application: 40 g/m$^2$. For each of the plating layers, an arithmetic average of coefficients of friction for five sliding reciprocations was determined as its coefficient of friction. The coefficients of friction of the plating layers are shown in Table 1.

TABLE 1

| Kind of plating | Coefficient of friction |
|---|---|
| Ni-P alloy plating layer | 0.135 |
| Zn-Ni alloy plating layer | 0.134 |
| Cu plating layer | 0.121 |
| Cr plating layer | 0.116 |
| Cu-Sn-Zn alloy plating layer | 0.115 |
| Zn plating layer | 0.105 |

[Fem Analysis]

Based on the results shown in Table 1, FEM analysis of shouldering torque, yield torque, and delta torque of a threaded connection for pipes with each of the plating layers formed thereon was conducted. As the threaded connection for pipes, (trade name) VAM21HT, size: 9⅝" 53.5 #made by NIPPON STEEL CORPORATION was employed. The FEM analysis was conducted on condition that the plating layers were not formed on a box side (left being ground, a surface on the box side was Fe) and were formed only on a In Table 2, columns "Analytical value" show torque values (ft. lbs) obtained by the FEM analysis. In Table 2, columns "Increase/decrease rate" show fluctuation rates (%) with respect to a value of the test number 7, the conventional example (Cu plated on its entire pin). In Table 2, Ts denotes the shouldering torque, Ty denotes the yield torque, and ΔT denotes the delta torque.

[Results of Evaluation]

Referring to Table 1 and Table 2, as to a test number 1 and a test number 2, in which plating layers having high coefficients of friction were formed on their shoulder parts, and plating layers having low coefficients of friction were formed on their thread parts and metal seal parts, their torque values were improved. Specifically, as to the test number 1 and the test number 2, their yield torques were higher than that of the test number 7 (conventional example) while their shouldering torques were consistent with that of the test number 7. In addition, their delta torques were larger than that of the test number 7 (conventional example).

In contrast, as to a test number 3 and a test number 4, in which plating layers having high coefficients of friction were formed on not only their shoulder parts but also their metal seal parts, their yield torques were higher than that of the test number 7 (conventional example), but their shouldering torques were also higher than that of the test number 7 (conventional example).

As to a test number 5 and a test number 6, in which plating layers having high coefficients of friction were formed on their thread parts and plating layers having low coefficients of friction were formed on their metal seal parts and shoulder parts, their shouldering torques were lower than that of the test number 7 (conventional example), but their yield torques were also lower than that of the test number 7 (conventional example). In addition, delta torques of the test number 5 and the test number 6 were lower than that of the test number 7 (conventional example).

As to a test number 8 and a test number 9, in which plating layers having coefficients of friction higher than that of a conventional Cu plating were formed on their thread parts, metal seal parts, and shoulder parts, their yield torques were higher than that of the test number 7 (conventional example), but their shouldering torques were also higher than that of the test number 7 (conventional example).

The embodiment of the present disclosure has been described heretofore. However, the aforementioned embodiment merely forms an example for carrying out the present disclosure. Accordingly, the present invention is not limited to the aforementioned embodiment, and the aforementioned embodiment may be carried out in a modified manner as appropriate without departing from the gist of the present disclosure.

REFERENCE SIGNS LIST

1: steel pipe
2: coupling
3: pin
31: pin side thread part
32: pin side metal seal part
33: pin side shoulder part
4: box
41: box side thread part
42: box side metal seal part
43: box side shoulder part
5: shoulder part plating layer
50: high friction coefficient plating layer
6: non-shoulder part plating layer
60: low friction coefficient plating layer
70: optional plating layer
80: lubricant coating

The invention claimed is:

1. A threaded connection for pipes, comprising:
a pin including a pin side thread part, a pin side metal seal part, and a pin side shoulder part;
a box including a box side thread part, a box side metal seal part, and a box side shoulder part;
a shoulder part plating layer which is arranged on the pin side shoulder part and/or the box side shoulder part, and includes one or more layers, wherein an outermost layer of the shoulder part plating layer is a high friction coefficient plating layer; and
a non-shoulder part plating layer which is arranged on at least one of the pin side thread part, the pin side metal seal part, the box side thread part, and the box side metal seal part, and includes one or more layers, wherein an outermost layer of the non-shoulder part plating layer is a low friction coefficient plating layer having a coefficient of friction lower than a coefficient of friction of the high friction coefficient plating layer.

2. The threaded connection for pipes according to claim 1, wherein the shoulder part plating layer is arranged on the pin side shoulder part, and the non-shoulder part plating layer is arranged on the pin side thread part and the pin side metal seal part.

3. The threaded connection for pipes according to claim 2, wherein the shoulder part plating layer has a thickness of 1 to 50 μm, and the non-shoulder part plating layer has a thickness of 1 to 50 μm.

4. The threaded connection for pipes according to claim 3, further comprising a lubricant coating arranged as an outermost layer on or above at least one of the pin side thread part, the pin side metal seal part, the pin side shoulder part, the box side thread part, the box side metal seal part, and the box side shoulder part, wherein the lubricant coating is in a liquid or semisolid state.

5. The threaded connection for pipes according to claim 2, further comprising a lubricant coating arranged as an outermost layer on or above at least one of the pin side thread part, the pin side metal seal part, the pin side shoulder part, the box side thread part, the box side metal seal part, and the box side shoulder part, wherein the lubricant coating is in a liquid or semisolid state.

6. The threaded connection for pipes according to claim 1, wherein
the shoulder part plating layer is arranged on the box side shoulder part, and
the non-shoulder part plating layer is arranged on the box side thread part and the box side metal seal part.

7. The threaded connection for pipes according to claim 6, wherein the shoulder part plating layer has a thickness of 1 to 50 μm, and the non-shoulder part plating layer has a thickness of 1 to 50 μm.

8. The threaded connection for pipes according to claim 7, further comprising a lubricant coating arranged as an outermost layer on or above at least one of the pin side thread part, the pin side metal seal part, the pin side shoulder part, the box side thread part, the box side metal seal part, and the box side shoulder part, wherein the lubricant coating is in a liquid or semisolid state.

9. The threaded connection for pipes according to claim 6, further comprising a lubricant coating arranged as an outermost layer on or above at least one of the pin side thread part, the pin side metal seal part, the pin side shoulder part, the box side thread part, the box side metal seal part, and the box side shoulder part, wherein the lubricant coating is in a liquid or semisolid state.

10. The threaded connection for pipes according to claim 1, wherein the shoulder part plating layer has a thickness of 1 to 50 μm, and the non-shoulder part plating layer has a thickness of 1 to 50 μm.

11. The threaded connection for pipes according to claim 10, further comprising a lubricant coating arranged as an outermost layer on or above at least one of the pin side thread part, the pin side metal seal part, the pin side shoulder part, the box side thread part, the box side metal seal part, and the box side shoulder part, wherein the lubricant coating is in a liquid or semisolid state.

12. The threaded connection for pipes according to claim 1, further comprising a lubricant coating arranged as an outermost layer on or above at least one of the pin side thread part, the pin side metal seal part, the pin side shoulder part, the box side thread part, the box side metal seal part, and the box side shoulder part, wherein the lubricant coating is in a liquid or semisolid state.

13. The threaded connection for pipes according to claim 1, wherein
the high friction coefficient plating layer is selected from the group consisting of a Ni—P alloy plating layer, a Zn—Ni alloy plating layer, a Cu plating layer, a Cr plating layer, and a Cu—Sn—Zn alloy plating layer, and
the low friction coefficient plating layer is selected from the group consisting of a Zn—Ni alloy plating layer, a Cu plating layer, a Cr plating layer, a Cu—Sn—Zn alloy plating layer, and a Zn Plating Layer.

14. The threaded connection for pipes according to claim 13, wherein
the high friction coefficient plating layer is selected from the group consisting of a Ni—P alloy plating layer and a Zn—Ni alloy plating layer, and
the low friction coefficient plating layer is selected from the group consisting of a Cu plating layer, a Cr plating layer, a Cu—Sn—Zn alloy plating layer, and a Zn plating layer.

* * * * *

UNITED STATES PATENT AND TRADEMARK OFFICE
CERTIFICATE OF CORRECTION

| | |
|---|---|
| PATENT NO. | : 11,933,431 B2 |
| APPLICATION NO. | : 17/427256 |
| DATED | : March 19, 2024 |
| INVENTOR(S) | : Kazuya Ishii et al. |

It is certified that error appears in the above-identified patent and that said Letters Patent is hereby corrected as shown below:

On the Title Page

Under (87), delete "WO2022/016650" and insert --WO2020/166500-- therefor.

Signed and Sealed this
Twenty-fifth Day of June, 2024

*Katherine Kelly Vidal*

Katherine Kelly Vidal
*Director of the United States Patent and Trademark Office*